(12) United States Patent
Ott et al.

(10) Patent No.: US 6,654,776 B1
(45) Date of Patent: Nov. 25, 2003

(54) METHOD AND APPARATUS FOR COMPUTING PARALLEL LEADING ZERO COUNT WITH OFFSET

(75) Inventors: Michael L. Ott, Pleasenton, CA (US); Ruey-Hsien Hu, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 546 days.

(21) Appl. No.: 09/587,176

(22) Filed: Jun. 2, 2000

(51) Int. Cl.[7] .............................................. G06F 15/00
(52) U.S. Cl. ...................................................... 708/211
(58) Field of Search ................................. 708/200, 211, 708/205, 212, 204, 210; 712/5

(56) References Cited

U.S. PATENT DOCUMENTS

| | | | |
|---|---|---|---|
| 4,586,154 A | * 4/1986 | Berry | 708/205 |
| 4,631,696 A | * 12/1986 | Sakamoto | 708/204 |
| 5,568,410 A | * 10/1996 | Bechade | 708/211 |
| 5,798,952 A | * 8/1998 | Miller et al. | 708/211 |
| 5,798,953 A | * 8/1998 | Lozano | 708/211 |
| 5,805,486 A | 9/1998 | Sharangpani | |
| 5,894,427 A | * 4/1999 | Chung | 708/212 |
| 5,940,625 A | * 8/1999 | Smith | 712/5 |
| 6,195,673 B1 | * 2/2001 | Park | 708/211 |
| 6,477,552 B1 | * 11/2002 | Ott | 708/211 |

\* cited by examiner

*Primary Examiner*—Chuong Dinh Ngo
*Assistant Examiner*—Chat C. Do
(74) *Attorney, Agent, or Firm*—Martine & Penilla, LLP

(57) ABSTRACT

A method and apparatus for computing leading zero count with offset (LZCO) using a parallel nibble calculation scheme. The invention receives as its input a first operand and a second "offset" operand. The first operand is identified by a plurality of nibbles, each comprising four bits. The LZCO calculator calculates the lower two bits of the result for each nibble while simultaneously (or in parallel) calculating the upper remaining bits of the result for each nibble. The LZCO also selects the resulting nibble calculation for the lower two bits and the upper bits according to the nibble that corresponds to the highest order nibble without all zero values.

10 Claims, 7 Drawing Sheets

METHOD AND APPARATUS FOR COMPUTING PARALLEL LEADING ZERO COUNT WITH OFFSET

BACKGROUND OF THE INVENTION

1. Field of the Invention

This invention pertains generally to microcomputer instruction sets. More particularly, the invention is a method and apparatus for computing leading zero count with offset using a parallel nibble calculation scheme.

2. The Prior Art

In certain microcomputer instruction sets such as the MAJC (Micro Architecture for Java Computing) architecture by Sun Microsystems®, a leading zero count with offset instruction is carried out. For example, when evaluation of the saturation of a fixed-length word is desired, the leading zero count with offset instruction provides the number of significant bits, allowing for an offset.

Leading zero count with offset (LZCO) instruction comprises counting the number of leading zeros in a first number and subtracting a second "offset" number from this count value. FIG. 1 shows a LZCO instruction implementation 1 according to the prior art.

As noted above, in LZCO instruction, two input operands, identified as RS1 (designated 2) and RS2 (designated as 3), are provided. By way of example, RS1 is depicted as a 32-bit number and RS2 is depicted as a 5-bit number. The count of leading zeros in RS1 must be determined. RS2 provides the "offset" value with is subtracted from the count of leading zeros (determined from RS1).

The count of leading zeroes in RS1 is determined by a conventional leading zero detector (LZD) 4. The LZD 4 comprises software and/or circuitry to evaluate RS1 and determine the count of leading zeros in RS1 (designated as 5). This count 5 is provided as an output from LZD 4 and in provided as a first input for the subtrator unit 6.

The subtractor unit 6 has as its second input the RS2 offset 3. The subtractor unit 6 subtracts the RS2 value 3 from the count of leading zeros (5) to generate a 6-bit number result (7).

It is desirable to provide an implementation which carries out this LZCO operation in a fast manner. The prior art algorithm, while providing the correct result (7), is carried out in a relatively slow manner because the LZD must complete its function before the subtraction can begin. These operations are carried out serially, maximizing the delay for the result.

Accordingly, there is a need for a method and apparatus which provides for faster calculation of leading zero count with offset instruction. The present invention satisfies these needs, as well as others, via a parallel nibble calculation scheme and generally overcomes the deficiencies found in the background art.

BRIEF DESCRIPTION OF THE INVENTION

The present invention is a method and apparatus for calculating leading zero count with offset (LZCO) instructions using a parallel nibble calculation scheme. The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

The invention operates upon two input operands, identified as RS1 and RS2. RS1 is represented by a plurality of nibbles, each nibble comprising four bits. For example, if RS1 comprises a thirty-two (32) bit number, RS1 is represented by eight (8) nibbles. Each nibble has a corresponding nibble placement within RS1 corresponding to a relative nibble order of significance. For example, in the 32-bit RS1 example, Nibble 7 corresponds to bits 31, 30, 29, and 28 of RS1, Nibble 6 corresponds to bits 27, 26, 25, and 24, Nibble 5 corresponds to bits 23, 22, 21 and 20, and Nibble 0 corresponds to bits 3, 2, 1 and 0. As will be readily apparent to those skilled in the art, each of the other nibbles 1, 2, 3, and 4 corresponds to bits associated with the nibble's placement within RS1.

Each nibble has a corresponding relative nibble order of significance, such that nibbles having higher bits will have a higher order of significance than nibbles having lower bits. For example, Nibble 7 comprising bits 31, 30, 29, and 28 will have a higher order of significance than Nibble 6 corresponding to bits 27, 26, 25 and 24 since bits 31, 30, 29, and 28 have a higher order of significance than bits 27, 26, 25 and 24. Accordingly, Nibble n will have a higher order of significance than Nibble (n−1).

The RS2 operand is provided as an "offset" value. As noted above, the desired result of the LZCO operation produces is a value of RS2 subtracted from the count of leading zeros in RS1. The present invention provides a parallel nibble calculation scheme to generate this result, as described herein.

According to a first embodiment of the invention, the method comprises calculating the lower two bits of the result for each nibble while simultaneously (or in parallel) calculating the upper remaining bits of the result for each nibble, and selecting the resulting nibble calculation for the lower two bits and the upper bits according to the nibble that corresponds to the highest order nibble without all zero values.

According to a second embodiment of the invention, the apparatus comprises a select circuit which receives as its input RS1 and produces an output; a lower two bits result calculator, having as its input RS1, RS2 and the select circuit output, the lower two bits result calculator providing an output; and an upper bit result calculator, having as its input RS2, the select circuit output, and the lower two bits result calculator output.

The output of the lower two bits result calculator provides the lower two bits of the desired LZCO operation result and a carryout value. The output of the upper bit result calculator provides the upper remaining bits of the desired LZCO operation result.

It will be apparent to those skilled in the art having the benefit of this disclosure that the invention is also suitable for calculating a leading ones count with offset using the parallel nibble calculation scheme of the present invention. Additionally, the invention is also suitable for calculation of leading zero/one count with an add offset, rather than a subtract offset with trivial modification to the embodiments as described herein as would be apparent to those skilled in the art. It is further noted that the present invention further provides a leading zero/one detector where the offset operand (RS2) is zero (0).

An object of the invention is to provide a method and apparatus for carrying out LZCO instruction which overcomes the deficiencies in the prior art.

Another object of the invention is to provide a method and apparatus for carrying out LZCO instruction which uses a parallel nibble calculation scheme.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Referring more specifically to the drawings, for illustrative purposes the present invention is embodied in the apparatus shown FIG. 2 through FIG. 8. It will be appreciated that the apparatus may vary as to configuration and as to details of the parts, and that the method may vary as to details and the order of the acts, without departing from the basic concepts as disclosed herein. The invention is disclosed generally in terms of performing a LZCO operation, although numerous other uses for the invention will suggest themselves to persons of ordinary skill in the art.

The example embodiment of the invention shown in FIG. 2 through FIG. 8 and described herein operates on a 32-bit operand (RS1) and a 5-bit operand (RS2), although the invention may be used with other bit size operands, as will be readily apparent to those skilled in the art having the benefit of this disclosure.

Figure 1:
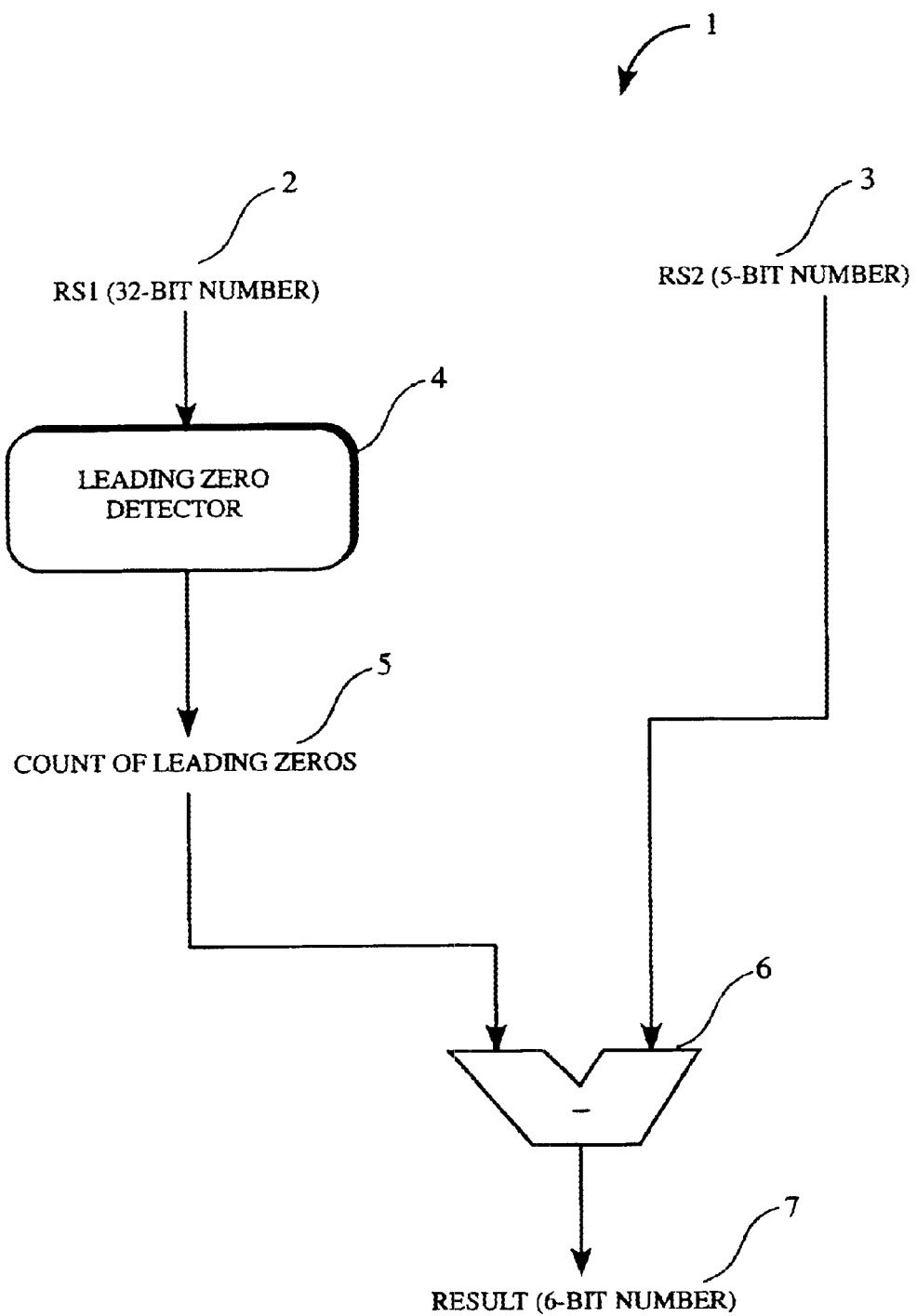
FIG. 1 is a functional block diagram of a LZCO operation implementation according to the prior art.
Figure 2:
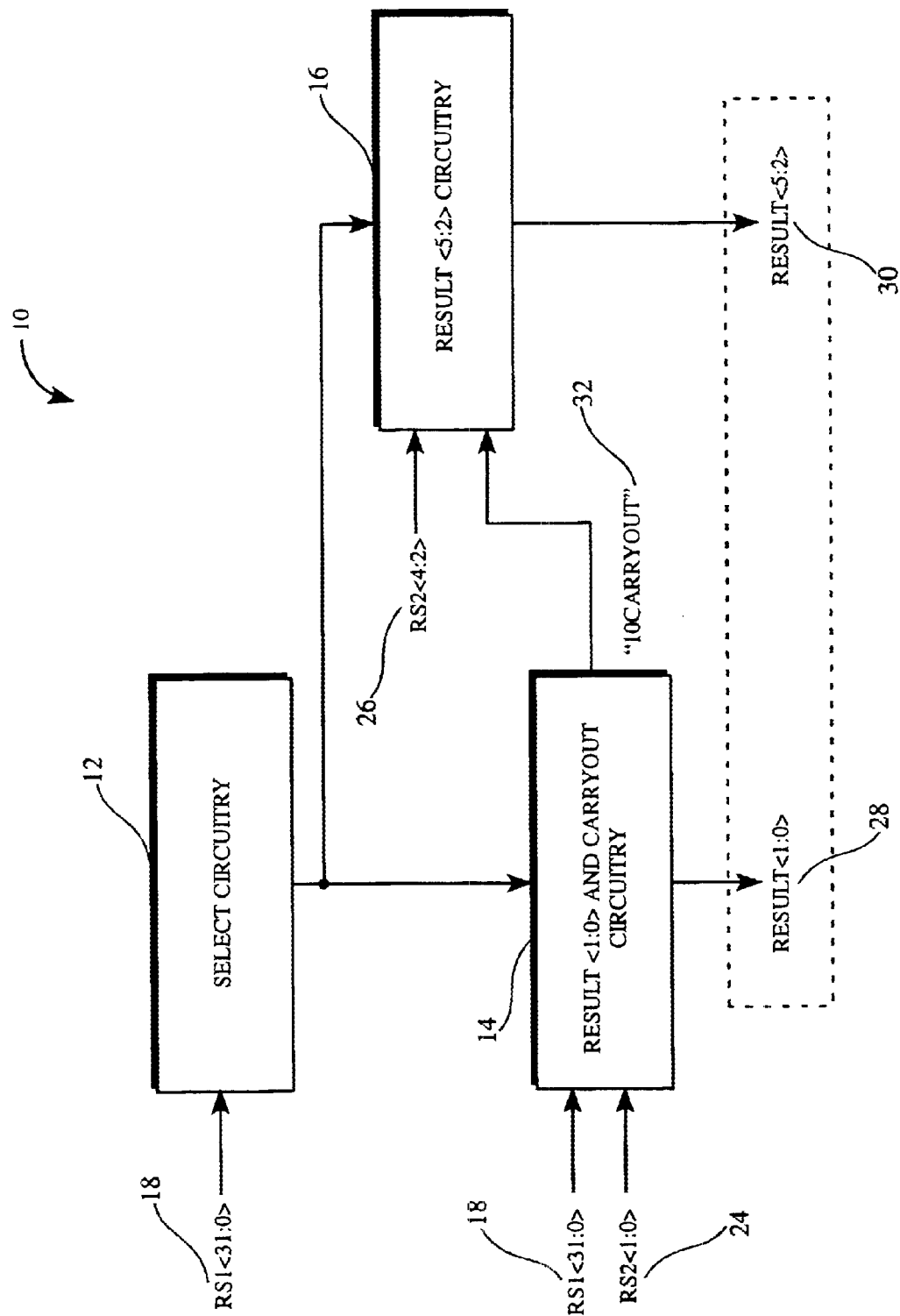
FIG. 2 is a functional block diagram of a LZCO operation implementation in accordance with the present invention.

Referring first to FIG. 2, a functional block diagram of a LZCO operation implementation 10 is generally shown. The LZCO operation implementation 10 comprises a select circuit 12, a lower two bits result calculator (generally designated as RESULT<1:0> AND CARRYOUT CIRCUITRY 14) operatively coupled to the select circuit 12, and an upper bits result calculator (generally designated as RESULT<5:2> CIRCUITRY 16) operatively coupled to the select circuit 12 and the Result<1:0> and carryout circuit 14.

Figure 3:
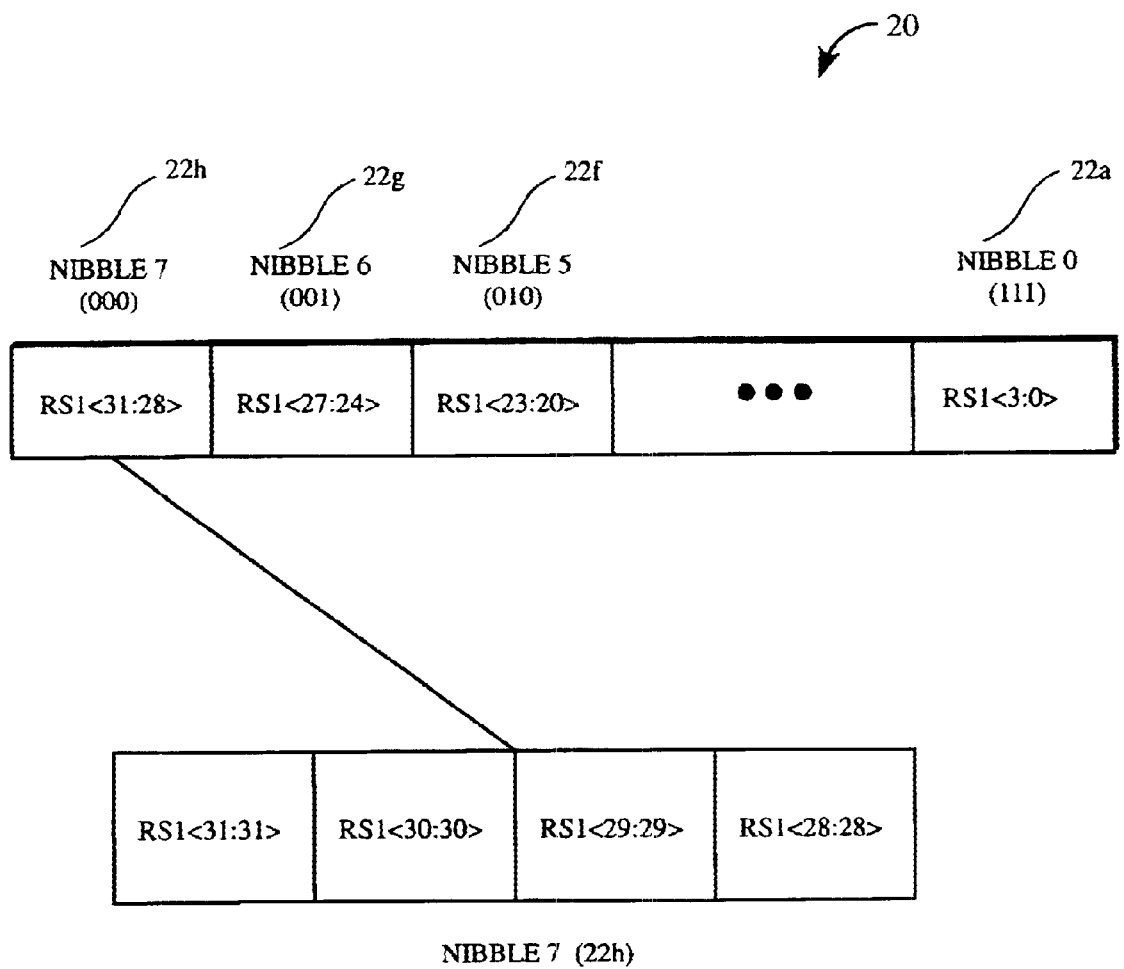
FIG. 3 is a block diagram depicting the nibble scheme structure of an operand in accordance with the present invention.

The select circuit 12 receives as its input operand RS1 18, which in the present example comprises a 32-bit number. RS1 18 may be further represented as RS1<31:0>, which further identifies bits 0 through 31 of RS1 18. Referring to FIG. 3, the nibble scheme structure 20 of RS1 18 is shown. Each nibble of the nibble structure 20 comprises four (4) bits of the operand.

Since RS1 18 comprises 32 bits, eight nibbles, identified as nibble 0 (22a) through nibble 7 (22h) are used to represent RS1 18. Nibble 0 (22a) comprises bits 0 through 3 of RS1 (RS1<3:0>). Nibble 1 (22b) comprises bits 4 through 7 of RS1 (RS1<7:4>). Nibble 2 (22c) comprises bits 8 through 11 of RS1 (RS1<11:8>) Nibble 3 (22d) comprises bits 12 through 15 of RS1 (RS1<15:12>). Nibble 4 (22e) comprises bits 16 through 19 of RS1 (RS1<19:16>). Nibble 5 (22f) comprises bits 20 through 23 of RS1 (RS1<23:20>). Nibble 6 (22g) comprises bits 24 through 27 of RS1 (RS1<27:24>). Nibble 7 (22h) comprises bits 28 through 31 of RS1 (RS1<31:28>).

Those skilled in the art will realized that a range of bits, such as bits n to RS1<n:n> or RS1<n>. Thus, as shown in FIG>3, bit 31 of Nibble 7 may be represented as RS1<31:31>. This notation is used herein to more particularly describe bits within operands and result values, including RS1, RS2, and the result of the LZCO operation.

Each nibble 22a through 22h further has a corresponding relative nibble order of significance according to its position relative to other nibbles. Nibbles comprising higher bits will a have a higher order of significance than nibbles comprising lower bits. For example, Nibble 7 (22h) comprising bits 31, 30, 29, and 28 will have a higher order of significance than Nibble 6 (22g) corresponding to bits 27, 26, 25 and 24 since bits 31, 30, 29, and 28 have a higher order of significance than bits 27, 26, 25 and 24. Accordingly, Nibble n will have a higher order of significance than Nibble (n−1).

Each nibble 22a through 22h further has a corresponding "position bit value" assigned thereto. The "position bit value" inversely corresponds to the nibble's order of significance such that nibble 7 (22h) is assigned "000", nibble 6 (22g) is assigned "001", nibble 5 (22f) is assigned "010", nibble 4 (22e) is assigned "011", nibble 3 (22d) is assigned "100", nibble 2 (22c) is assigned "101", nibble 1 (22b) is assigned "110", and nibble 0 (22a) is assigned "111". As described further below and in conjunction with FIG. 8, each nibble's "position bit value" is provided to result<5:2> circuit 16 for calculation of the result<5:2> of the LZCO operation result.

Referring again to FIG. 2, as well as FIG. 3, the select circuit 12 is operatively coupled to and provides output (a plurality of select signals) which drives Result<1:0> and carryout circuit 14 and result<5:2> circuit 16. The select circuit 12 and its operation are described in more detail below in conjunction with FIG. 4.

The Result<1:0> and carryout circuit 14 carries out the operation of providing the lowest two bits of the LZCO operation result (i.e., RESULT<1:0>, designated 28). The Result<1:0> and carryout circuit 14 receives as its input the two operands RS1 18 and RS2. More particularly, Result<1:0> and carryout circuit 14 receives only the two lowest bits of RS2 (i.e., RS2<1:0>24). Additionally, the select circuit 12 output is used by the Result<1:0> and carryout circuit 14 to select from a plurality of "nibble calculations" carried out as part of the Result<1:0> and carryout circuit 14 to derive the RESULT<1:0> value 28. The "nibble calculation" is described in more detail below in conjunction with FIG. 6. The derivation of the RESULT<1:0>28 from the "nibble calculations" with the use of the select circuit 12 output is also more fully described below in conjunction with FIG. 7.

The Result<1:0> and carryout circuit 14 is further coupled to result<5:2> circuit 16 and provides a "10 carryout" signal 32 which is provided to result <5:2> circuit 16. The "10 carryout" signal is determined in conjunction with the "nibble calculation", the details of which are provided in conjunction with FIG. 6 and Table 1 below.

In general, result<5:2> circuit 16 carries out the operation of providing the upper remaining bits (i.e., except bit<0> and<1>) of the LZCO operation result (i.e., RESULT<5:2>, designated 30). The result<5:2> circuit 16 is operatively coupled to Result<1:0> and carryout circuit 14 to receive the "10 carryout" signal 32. The result<5:2> circuit 16 further receives as its input the remaining upper bits of RS2<4:2>26 (i.e., bits<2>,<3>,<4> of RS2, where RS2 bits). The result<5:2> circuit 16 also receives a plurality of select signal outputs generated by the select circuit 12. The result<5:2> circuit 16 is described more fully below in conjunction with FIG. 8.

Figure 4:
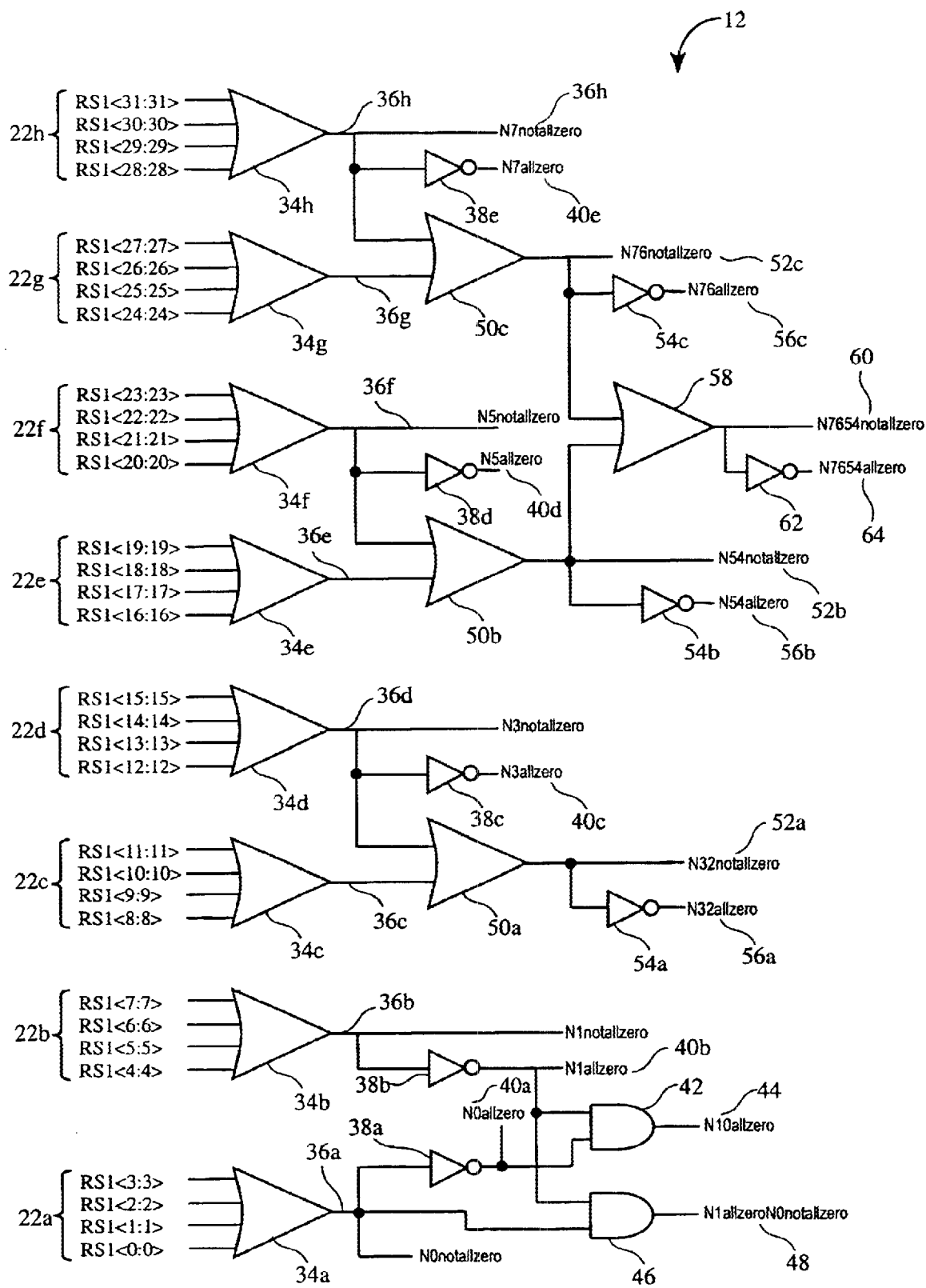
FIG. 4 is block diagram of the select circuitry in accordance with the present invention.

Referring now to FIG. 4, as well as FIG. 2 and FIG. 3, a block diagram of an exemplary select circuit 12 in accordance with the present invention is shown. Select circuit 12 receives as its input the operand RS1 18. Operand RS1 18 is received into and is operated on by the select circuit 12 according to nibbles (nibble 0 (22a) through nibble 7 (22h)).

Each nibble 22a through 22h is evaluated by a first OR gate 34a through 34h, respectively. For example, Nibble 0 (22a) is evaluated by OR gate 34a. The output of each OR gate 34a through 34h produces an output 36a through 36h, respectively, according to the data in each nibble such that a "1" output indicates that the corresponding nibble does not contain all zero values and a "0" output indicates that the corresponding nibble comprises all zero values. For example, if each bit 0 through 3 of RS1 (i.e., RS<3:0>) comprises a "0" value, then output 36a (N0notallzero) of gate 34a would be "0".

Each output of gates 34a, 34b, 34d, 34f, and 34g drive a corresponding inverter 38a, 38b, 38c, 38d, and 38e to invert outputs 36a, 36b, 36d, 36f, and 36h, respectively. Accordingly, outputs 40a (N0allzero), 40b (N1allzero), 40c (N3allzero), 40d (N5allzero), and 40e (N7allzero) provide the inverted outputs of 36a, 36b, 36d, 36f, and 36h, respectively.

Output 40b (N1allzero) and output 40a (N0allzero) drive an AND gate 42 to generate output 44 (N10allzero) which indicates a "1" when both Nibble 1 and Nibble 0 comprises all zero values. Output 40b (N1allzero) and output 36a (N0notallzero) drive an AND gate 46 to generate output 48 (N1allzeroN0notallzero) which indicates a "1" when Nibble 1 (22b) comprises all zero values and Nibble 0 does not comprise all zero values.

Output 36c and 36d drive an OR gate 50a to generate output 52a which indicates a "1" when either Nibble 2 (22c) or Nibble 3 (22d) does not comprise all zero values. Likewise, output 36e and 36f drive OR gate 50b to generate output 52b which indicates a "1" when either Nibble 4 (22e) or Nibble 5 (22f) does not comprise all zero values; output 36g and 36h drive OR gate 50c to generate output 52c which indicates a "1" when either Nibble 6 (22g) or Nibble 7 (22h) does not comprise all zero values. Each output 52a, 52b, 52c drive a corresponding inverter 54a, 54b, 54c to generate inverted outputs 56a (N32allzero), 56b (N54allzero), 56c (N76allzero), each indicating "1" when corresponding nibbles associated therewith comprise all zero values.

Output 52b (N54notallzero) and 52c (N76notallzero) drive an OR gate 58 to generate output 60 (N7654notallzero) which indicates "1" when any of Nibble 4 (22e), Nibble 5 (22f), Nibble 6 (22g) or Nibble 7 (22h) does not comprise all zero values. Output 60 (N7654notallzero) drives inverter 62 to generate output 64 (N7654allzero) which indicates "1" when each of Nibble 4 (22e), Nibble 5 (22f), Nibble 6 (22g) or Nibble 7 (22h) comprise all zero values. The outputs of select circuit 12 provide select signals to Result<1:0> and carryout circuit 14 and result<5:2> circuit 16, as described below in FIG. 7 and FIG. 8.

Figure 5:
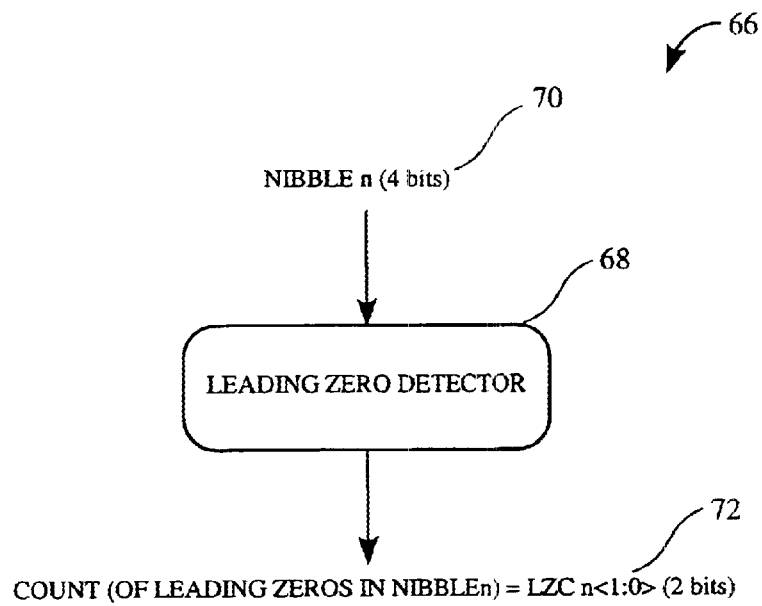
FIG. 5 is a functional block diagram depicting the nibble leading zero detector process in accordance with the present invention.

Referring now to FIG. 5, as well as FIG. 2 through FIG. 4, a block diagram depicting the nibble leading zero detector (LZD) process 66 in accordance with the present invention is shown. The LZD process 66 is a generally carried out in conjunction with the Result<1:0> and carryout circuit 14.

In general, the LZD process 66 comprises determining the count of leading zeros (LZC) for each nibble 22a through 22h. A conventional leading zero detector (LZD) 68 is provided which receives the nibble data (NIBBLE n, where n is the nibble number) 70 and generates LZC n output 72. Since each nibble is four bits, the LZC output is 2 bits (i.e., LZC<1:0>). This process is carried out for each nibble of RS1 18 simultaneously (in parallel). Accordingly, a plurality of LZDs are provided, one for each nibble.

The following truth table (Table 1) provides the logic used by the LZD 68 to generate LZC 72:

TABLE 1

| Nibble n bit pattern | LCZ n <1:0> |
|---|---|
| 1*** | 00 |
| 01** | 01 |
| 001* | 10 |
| 0001 | 11 |
| 0000 | 00 |

In Table 1, the first column provides the bit pattern detected by LZD 68 and the associated right column provides the LZC 72 for the corresponding bit pattern. An asterisk (*) in the bit pattern indicates that the value is not relevant for the purposes of determining LZC 72. For example, a bit pattern of "0110" corresponds to an LZC value of "01". The generated LZC value 72 for each nibble is then provided to the nibble calculation described below in conjunction with FIG. 6.

Figure 6:
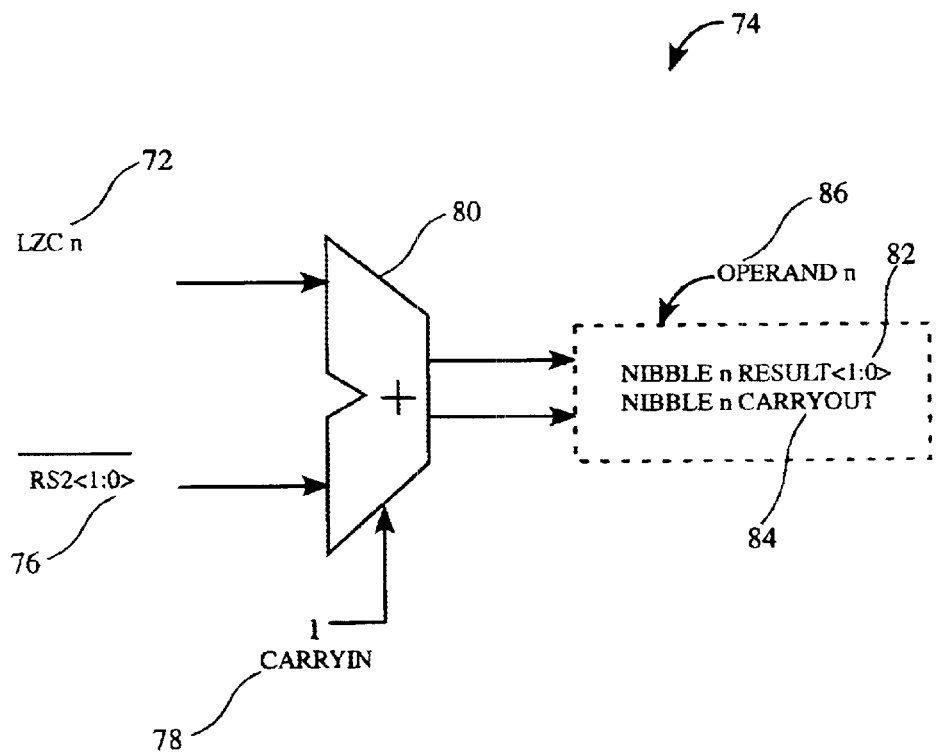
FIG. 6 is a functional block diagram depicting an individual lower two bits nibble calculation in accordance with the present invention.

Referring now to FIG. 6, as well as FIGS. 2 through 5, a block diagram depicting an individual lower two bits nibble calculator 74 in accordance with the present invention is shown. As with the LZD 68 described above, the nibble calculation as described herein is carried out simultaneously (in parallel) for each nibble. The following discussion provides the details of a single nibble calculator 74 although a plurality of nibble calculators to process RS1 18, one nibble calculator 74 for each nibble 22a through 22h. Hence, conventional notation, such as LZC n and OPERAND n, is used where n is the nibble number.

In general, the nibble calculator 74 calculates the lower two bits of the result value (RESULT<1:0>28). The invention provides that this nibble calculation is carried out for each nibble. The individual nibble calculations are provided to the filtering circuit of FIG. 7 which determines which nibble calculation is the correct one, to thereby derive RESULT<1:0>28.

The nibble calculation involves subtracting the two lowest bits (i.e., bit 0 and bit 1 or<1:0>) of the offset RS2 (24) from the LZC count (72) determined for each nibble in FIG. 5. As is known in the art, this subtraction may be carried out by inverting RS2<1:0> into $\overline{RS2<1:0>}$ 76 and adding LZC (72) and providing a "1" carry-in 78.

As shown in FIG. 6, a nibble calculator 74 which comprises a conventional adder 80 is provided to receive inputs LZC 72, $\overline{RS2<1:0>}$ 76, and the "1" carry-in 78. The adder 80 adds the input values to derive RESULT<1:0>82 for the particular nibble (NIBBLE n). The adder 80 also generates a carryout value 84 for the calculation. Table 2 provides the results of the nibble calculation and the carryout value, according to various input values in accordance with the invention:

TABLE 2

| LZC n | $\overline{RS2<1:0>}$ | 1 Carry-In | Result <1:0> | Carry-Out |
|---|---|---|---|---|
| 00 | 00 | 1 | 01 | 0 |
| 01 | 00 | 1 | 10 | 0 |
| 10 | 00 | 1 | 11 | 0 |
| 11 | 00 | 1 | 00 | 1 |
| 00 | 01 | 1 | 10 | 0 |
| 01 | 01 | 1 | 11 | 0 |
| 10 | 01 | 1 | 00 | 1 |
| 11 | 01 | 1 | 01 | 1 |
| 00 | 10 | 1 | 11 | 0 |
| 01 | 10 | 1 | 00 | 1 |
| 10 | 10 | 1 | 01 | 1 |
| 11 | 10 | 1 | 10 | 1 |
| 00 | 11 | 1 | 00 | 1 |
| 01 | 11 | 1 | 01 | 1 |
| 10 | 11 | 1 | 10 | 1 |
| 11 | 11 | 1 | 11 | 1 |

The nibble calculation 74 is carried out for each Nibble 22a through 22h. The generated RESULT<1:0>82 and associated carryout value 84 are identified as OPERAND n 86 for corresponding nibble and are fed to the filtering circuit of FIG. 7.

FIG. 5 and FIG. 6 may further be carried out in a single process (rather than serially) to further optimize the performance of the present invention. Table 3 (below) defines logic suitable for carrying out the operations of FIG. 5 and FIG. 6 in a single process to derive the RESULT<1:0>82 and associated carryout value 84. The logic defined in Table 3 may be carried out using conventional logic circuit as known in the art.

TABLE 3

| RS1 | RS2<1:0> | Result<1:0> | 10 Carryout |
|---|---|---|---|
| 1*** | 00 | 00 | 1 |
| 1*** | 01 | 11 | 0 |
| 1*** | 10 | 10 | 0 |
| 1*** | 11 | 01 | 0 |
| 01** | 00 | 01 | 1 |
| 01** | 01 | 00 | 1 |
| 01** | 10 | 11 | 0 |
| 01** | 11 | 10 | 0 |
| 001* | 00 | 10 | 1 |
| 001* | 01 | 01 | 1 |
| 001* | 10 | 00 | 1 |
| 001* | 11 | 11 | 0 |
| 0001 | 00 | 11 | 1 |
| 0001 | 01 | 10 | 1 |
| 0001 | 10 | 01 | 1 |
| 0001 | 11 | 00 | 1 |
| 0000 | 00 | 00 | 1 |
| 0000 | 01 | 11 | 0 |

TABLE 3-continued

| RS1 | RS2<1:0> | Result<1:0> | 10 Carryout |
|---|---|---|---|
| 0000 | 10 | 10 | 0 |
| 0000 | 11 | 01 | 0 |

In Table 3, column one identifies the bit pattern for the nibble. An asterisk (*) in the bit pattern indicates that the value for the bit is not relevant for the purposes of determining the RESULT<1:0>. The second column indicates the RS2<1:0> value. As noted above, the generated RESULT<1:0>82 and associated carryout value 84 are identified as OPERAND n 86 for corresponding nibble and are fed to the filtering circuit of FIG. 7.

Figure 7:
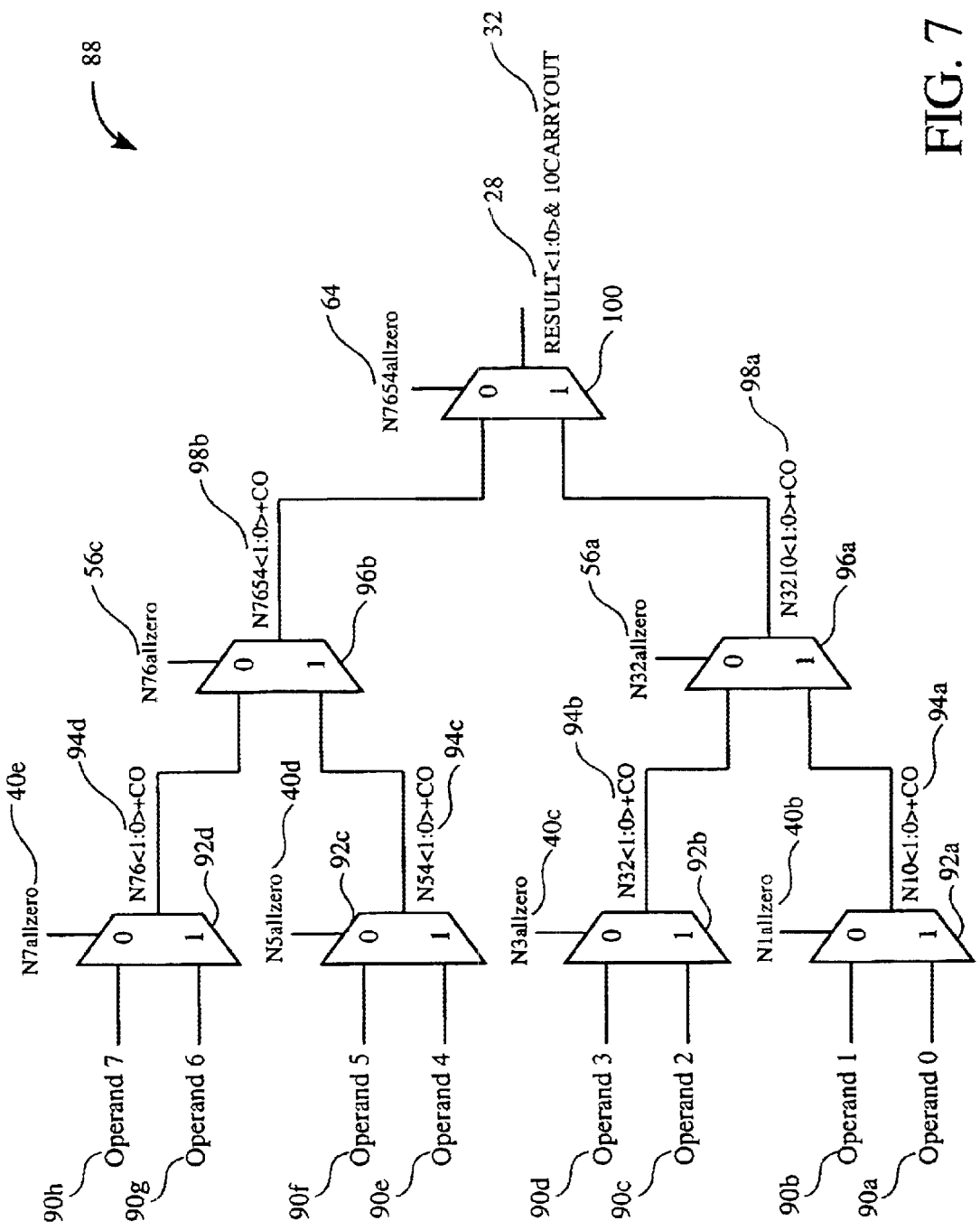
FIG. 7 is a block diagram of the full lower two bits calculation circuit in accordance with the present invention.

Referring now to FIG. 7, a block diagram of a lower two bits calculation circuit 88 in accordance with the invention is shown. FIG. 7, taken together with FIG. 5 and FIG. 6, provide an illustrative implementation suitable for carrying out the operation of the Result<1:0> and carryout circuit 14.

Calculation circuit 88 receives as its input the result of the nibble calculation described above in FIG. 6. These nibble calculations are generally designated as Operand 0 (90a) through Operand 7 (90h), each identified with a corresponding RS1 nibble 22a through 22h, respectively. Circuit 88 carries out the operation of filtering the nibble calculations (Operands 0 through 7) using the select signals provided by the select circuit 12 to derive the RESULT<1:0> and carryout value which corresponds to the highest order nibble without all zero values.

Circuit 88 carries out its filtering by removing half of the nibble calculations at each level of mixing until the remaining highest order nibble calculation without all zero values remains. Accordingly, operand 0 (90a) and operand 1 (90b) drive multiplexer (MUX) 92a; operand 2 (90c) and operand 3 (90d) drive MUX 92b; operand 4 (90e) and operand 5 (90f) drive MUX 92c; and operand 6 (90g) and operand 7 (90h) drive MUX 92d. It will be apparent to those skilled in the art that multiplexers 92b through 92d operate in the manner as described herein in for MUX 92a.

Each MUX 92a through 92d, receives a select signal from select circuit 12 to select one the input operands. For example, the select signal for MUX 92a is signal 40b (N1allzero). As described above, N1allzero (40b) will be a "1" value if Nibble 1 (22b) comprises all zero values. In such case, between Nibble 1 (22b) and Nibble 0 (22a), the MUX 92a selects Operand 0 (associated with Nibble 0) and Operand 1 is discarded as irrelevant since the Nibble associated therewith comprises all zero values. N1allzero (40b) will be a "0" value if Nibble 1 (22b) does not comprise all zero values. In this case, between Nibble 1 (22b) and Nibble 0 (22a), the MUX 92a selects Operand 1 (associated with Nibble 1) and Operand 0 is discarded since Nibble 1 has a higher significance than Nibble 0 and since Nibble 1 does not comprise all zero values, and therefore its associated Operand 1 is relevant.

The output of MUX 92a is identified as N10<1:0>+CO (Nibble 1 and Nibble 0 and carryout), designated 94a, which is the selected operand according to the logic described above. Outputs N32<1:0>+CO (94b), N54<1:0>+CO (94c), and N76<1:0>+CO (94d) are provided by MUX 92b, 92c, 92d respectively for the operands associated with each MUX 92b, 92c, 92d.

The output from MUX 92a (94a) and MUX 92b (94b) drive MUX 96a; the output from MUX 92c (94c) and MUX 92d (94d) drive MUX 96b. MUX 96a selects between output 94a and 94b according to signal select line N32allzero (56a) provided by select circuit 12. MUX 96b selects between output 94c and 94d according the signal provided by select line N76allzero (56c).

The select signal N76allzero (56c) will be a "1" value if both nibbles 6 and 7 comprise all zero values. In this case, MUX 96b selects output 94c, and output 94d is discarded as irrelevant since the nibbles associated with output 94d (i.e., nibble 6 and 7) comprise all zero values. N76allzero (56c) will be a "0" value if either nibbles 6 or 7 do not comprise all zero values. In this case, MUX 96b selects output 94d, and output 94c is discarded since the nibbles associated with output 94d are of higher significance and do not comprise all zero values. The operation of MUX 96a is substantially the same as described herein for MUX 96b.

MUX 96b generates output N7654<1:0>+CO (designated 98b), and MUX 96a generates output N3210<1:0>+CO (designated 98a). Outputs 98a and 98b drive MUX 100, which receives as its select signal line N7654allzero (64) from select circuit 12. N7654allzero (64) will be a "1" value if each nibbles 4, 5, 6 and 7 comprise all zero values. In this case, MUX 100 selects output 98a, and output 98b is discarded as irrelevant since the nibbles associated with output 98b (i.e., nibble 4,5, 6 and 7) comprise all zero values. N7654allzero (64) will be a "0" value if any of nibbles 4, 5, 6 or 7 do not comprise all zero values. In this case, MUX 100 selects output 98b, and output 98a is discarded since the nibbles associated with output 98b are of higher significance and do not comprise all zero values.

The resulting output of MUX 100 is a selection of one of the operands (90a through 90h) which corresponds to the highest order nibble without all zero values. As noted above (FIG. 6 and Table 2), each operand 90a through 90h includes a RESULT<1:0> value and a carryout signal. The select operand (output from MUX 100) provides the RESULT<1:0>28 of the LZCO operation and the "10CARRYOUT" signal provided to Result<5:2> circuit 16 as described below.

Figure 8:
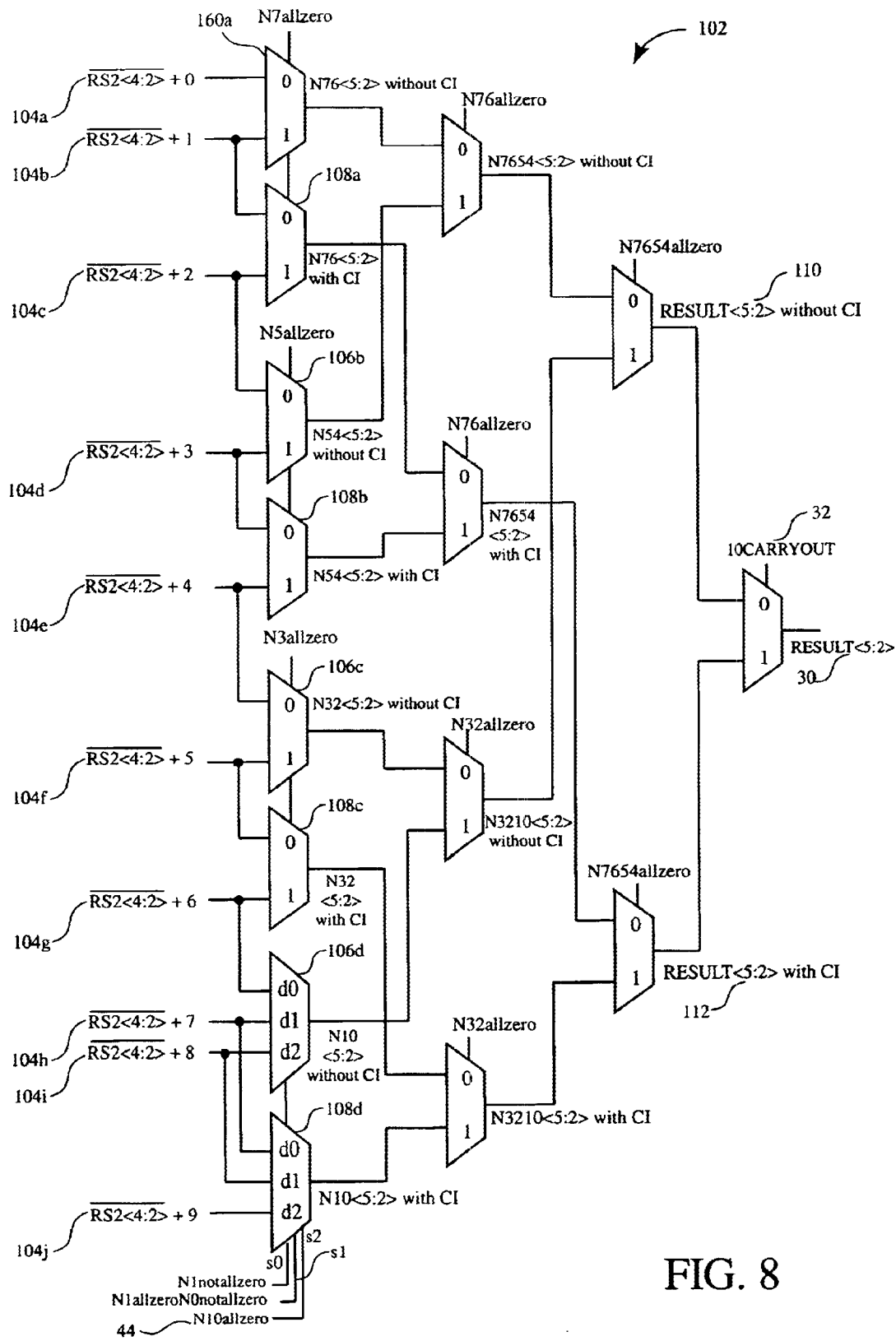
FIG. 8 is a functional block diagram of the upper bits calculation circuit in accordance with the present invention.

Referring now to FIG. 8, a block diagram of the upper bits calculation circuit 102 in accordance with the present invention is shown. Circuit 102 is an illustrative circuit suitable for carrying out the operation of Result<5:2> circuit 16 (i.e., providing the upper bits of the LZCO operation or RESULT<5:2>30).

Circuit 102 receives as its input a plurality of operands 104a through 104j. The circuit 102 carries out the operation of filtering the operands 104a through 104j using the select signals provided by the select circuit 12 and the "10CARRYOUT" value from circuit 88 to derive the RESULT<5:2> which corresponds to the highest order nibble without all zero values.

Each operand 104a through 104j comprises the sum of the inverse of bits 2,3,4 of the offset RS2 (i.e., $\overline{RS2<4:2>}$) and a nibble "position bit value" (as described above in conjunction with FIG. 3). As noted above, nibble 7 has a position bit value of "000", and nibble 1 has a position bit value of "111". The other nibbles have corresponding position bit values.

The operands 104a through 104j (sum of $\overline{RS2<4:2>}$ with the "position bit value") correspond to the RESULT<5:2> of the LZCO operation for the corresponding nibble. Circuit 102 therefore calculates this sum for each nibble (22a through 22h), and uses a plurality of cascading multiplexers in combination with signals from the select circuit 12 to ascertain the appropriate RESULT<5:2>(without carry-in) 110 which corresponds to the highest order nibble without all zero values.

For example, operands 104a, which relates to nibble 7 comprises ($\overline{RS2<4:2>}$+"000"). Operand 104b, which relates to nibble 6 comprises ($\overline{RS2<4:2>}$+"001"). Operands 104a and 104b drive MUX 106a. The select line N7allzero (40e) selects operand 104b when signal 40e is "1", otherwise operand 104a is selected. This selection process is similar to that described above for FIG. 7 and the remaining filtering for RESULT<5:2> without carry-in. Accordingly, MUX 106b, 106c, 106d are provided to filter operands associated with nibble pairs 5 and 4 (operands 104c, 104d), 3 and 2 (operands (104e, 104f), 1 and 0 (operands (104g, 104h, 104i) respectively.

A special case is provided with respect to the analysis of Nibble 1 and Nibble 0 in the case where Nibble 1 and Nibble 0 comprise all zero values in MUX 106d. Accordingly, a third signal 104i is introduced and is selected when signal N10allzero is a "1" value. Where Nibble 1 and Nibble 0 comprise all zero values, the "position bit value" is fixed at "1000" which represents 32 (i.e., 1000**, in binary) and is provided for the situation when RS1<31:0>is all zeros. MUX 106d selects operand 104i when select line 44 (N10allzero) is a "1" value.

Since the associated RESULT<1:0> value may have a carryout value of "1", circuit 102 further calculates the sum of ($\overline{RS2<4:2>}$, the "position bit value", and "1"). Accordingly, Circuit 102 calculates this sum for each nibble (22a through 22h) and uses a plurality of cascading multiplexers in combination with signals from the select circuit 12 to ascertain the appropriate RESULT<5:2>(with carry-in) 112 which corresponds to the highest order nibble without all zero values.

It is noted that the sum of ($\overline{RS2<4:2>}$, the "position bit value", and "1") is the equivalent to the sum of ($\overline{RS2<4:2>}$, the "position bit value" of the next lower order nibble). For example, for Nibble 7, the sum of ($\overline{RS2<4:2>}$, "000", and "1") is the equivalent of the sum of ($\overline{RS2<4:2>}$, and "001") which is the same as operand 104b. Similarly, for Nibble 6, the sum of ($\overline{RS2<4:2>}$, "001", and "1") is the equivalent of the sum of ($\overline{RS2<4:2>}$, and "010") which is the same as operand 104c. Thus for computing RESULT<5:2> with carry-in, Circuit 102 receives operands 104b and 104c to drive MUX 108a to determine N76<5:2> value with carry-in.

The select line N7allzero (40e) selects which selects MUX 106a also selects MUX 108a. MUX 108a selects operand 104c when signal 40e is "1", otherwise operand 104b is selected. This selection process is similar to that described above for MUX 106a. Accordingly, MUX 108b, 108c, 108d are provided to filter operands associated with nibble pairs 5 and 4 (operands 104d, 104e), 3 and 2 (operands (104f, 104g), 1 and 0 (operands (104h, 104i, 104j) respectively.

Similar to the calculation without carry-in (MUX 106d), MUX 108d handles the special case where Nibble 1 and Nibble 0 comprise all zero values. Here operand 104i includes position bit value 1000 and operand 104j includes position bit value 1001 which represents 32 plus carry-in (i.e., 1000**+1, in binary). In the special case of Nibble 1 and Nibble 0 comprising all zero bits, MUX 108d selects operand 104j when select line 44 (N10allzero) is a "1" value.

Circuit 102 uses the 10CARRYOUT signal 32 from Result<1:0> and carryout circuit 14 to select either the RESULT<5:2>(without carry-in) 110 or the RESULT<5:2> (with carry-in) 112 to provide the RESULT<5:2>30 which corresponds to the LZCO operation. RESULT<5:2>30 together with RESULT<1:0> provide the LZCO operation of operand RS1 and offset RS2.

Accordingly, it will be seen that this invention provides a method and apparatus for computing leading zero count with offset using a parallel nibble calculation scheme. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for calculating a leading zero count with offset result of two operands, identified as RS1 which represents an operand from which a count of leading zeros is determined and RS2 which is an operand providing an offset value, RS1 operand representing by a plurality of four-bit nibbles, each nibble having a nibble placement within RS1 corresponding to a relative nibble order of significance, said method comprising:
   a) calculating lower two candidate bits of a result for each nibble;
   b) simultaneously with said calculating of said lower two bits, calculating upper remaining candidate bits of the result corresponding to each nibble; and
   c) selecting the resulting nibble calculation for said lower two candidate bits and said upper remaining candidate bits which corresponds to a highest order nibble without all zero values.

2. The method of claim 1, wherein said calculating of said lower two candidate bits for each nibble comprises:
   a) determining the number of leading zeros in said nibble; and
   b) subtracting lower two bits of RS2 from said number of leading zeros in said nibble.

3. The method of claim 1, wherein each said nibble placement is further associated with a bit value corresponding to its nibble order of significance, said calculating said upper remaining candidate bits of said result for each nibble placement bit value corresponding to said nibble.

4. A leading zero count with offset (LZCO) instruction calculator to calculate the LZCO instruction result of two operands, identified as RS1 which represents an operand from which a count of leading zeros is determined and RS2 which is an operand providing an offset value, RS1 operand represented by a plurality of four-bit nibbles, each nibble having a nibble placement within RS1 corresponding to a relative nibble order of significance, said apparatus comprising:
   a) a select circuit, having as its input RS1, said select circuit providing an output;
   b) a lower two bits result calculator, having as its input RS1, RS2 and said select circuit output, said lower two bits result calculator providing an output; and
   c) an upper bits result calculator, having as its input RS2, said select circuit output, and said lower two bits result calculator output.

5. The LZCO calculator of claim 4, wherein said lower two bits result calculator is structured and configured to determine the number of leading zeros in said nibble, said lower two bits result calculator further structured and configured to subtract lower two bits of RS2 from said number of leading zeros in said nibble.

6. The LZCO calculator of claim 5, wherein each said nibble placement is further associated with a bit value corresponding to its nibble order of significance, said upper bits result calculator structured and configured to subtract the upper remaining bits of RS2 from each nibble placement bit value corresponding to said nibble.

7. The LZCO calculator of claim 6, wherein said select circuit is configured to select said resulting nibble calculation for said lower two bits and said upper bits which corresponds to the highest order nibble without all zero values.

8. A program storage device readable by a machine, tangibly embodying a program of instructions executable by the machine to perform a method for calculating a leading zero count with offset result of two operands, identified as RS1 which represents an operand from which a count of leading zeros is determined and RS2 which is an operand providing an offset value, RS1 operand represented by a plurality of four-bit nibbles, each nibble having a nibble placement within RS1 corresponding to a relative nibble order of significance, said method comprising:
   a) calculating lower two candidate bits of a result for each nibble;
   b) simultaneously with said calculating of said lower two bits, calculating upper remaining candidate bits of the result corresponding to each nibble; and
   c) selecting the resulting nibble calculation for said lower two candidate bits and said upper remaining candidate bits which corresponds to a highest order nibble without all zero values.

9. The program storage device of claim 8, wherein said calculating of said lower two candidate bits for each nibble comprises:
   a) determining the number of leading zeros in said nibble; and
   b) subtracting h lower two bits of RS2 from said number of leading zeros in said nibble.

10. The program storage device of claim 9, wherein each said nibble placement is further associated with a bit value corresponding to its nibble order of significance, said calculating said upper remaining candidate bits of said result for each nibble further comprising subtracting upper remaining bits of RS2 from each nibble placement bit value corresponding to said nibble.

* * * * *